D. FISHER.
COMBINED CHUCK AND DRIVING DOG.
APPLICATION FILED OCT. 22, 1908.
918,031.
Patented Apr. 13, 1909.
2 SHEETS—SHEET 1.
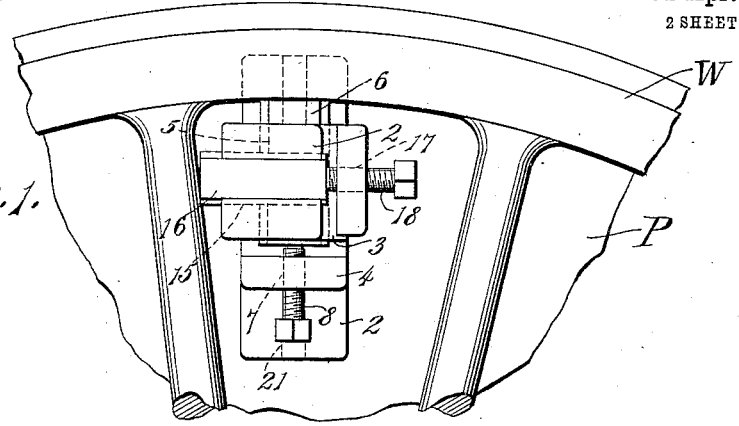
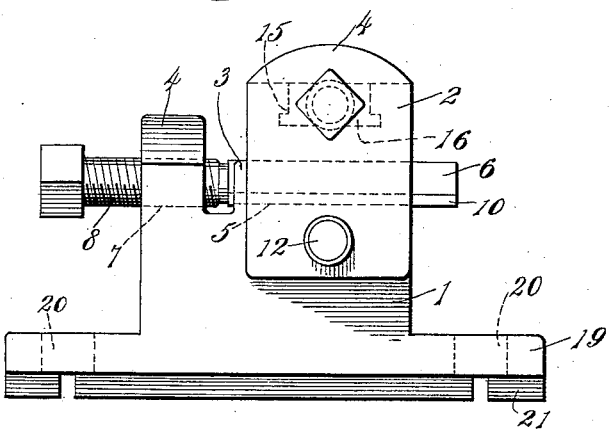
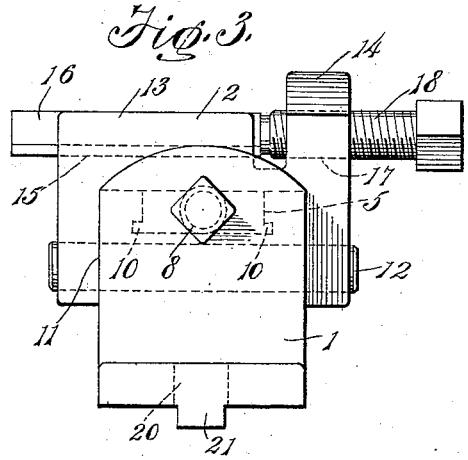
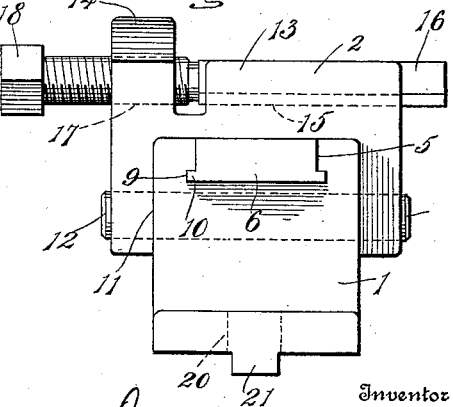
Witnesses
Row S. Johnson
Nina L. Martin
Inventor
Dyson Fisher
By Watson E. Coleman
Attorney

D. FISHER.
COMBINED CHUCK AND DRIVING DOG.
APPLICATION FILED OCT. 22, 1908.

918,031.

Patented Apr. 13, 1909.

Witnesses
Rose S. Johnson
Nina L. Martin

Inventor
Dyson Fisher
By Watson E. Coleman
Attorney

UNITED STATES PATENT OFFICE.

DYSON FISHER, OF BURNHAM, PENNSYLVANIA.

COMBINED CHUCK AND DRIVING-DOG.

No. 918,031.  Specification of Letters Patent.  Patented April 13, 1909.

Application filed October 22, 1908. Serial No. 459,090.

*To all whom it may concern:*

Be it known that I, DYSON FISHER, a citizen of the United States, residing at Burnham, in the county of Mifflin and State of Pennsylvania, have invented certain new and useful Improvements in a Combined Chuck and Driving-Dog, of which the following is a specification, reference being had to the accompanying drawings.

This invention is an improved combination lathe or boring machine chuck and driving dog.

The object of the invention is to provide a simple and practical device of this character which may be used in a variety of ways as a chuck for holding work upon the face plate of a lathe or on a horizontal boring machine, drill press and the like, its parts being so constructed and arranged that it may be quickly and easily adjusted to accommodate pieces of work of different size and shape.

A further object of the invention is to provide a device of this character which may be also used as a driving dog as well as for a chuck.

With the above and other objects in view, the invention consists of the novel features of construction and the combination and arrangement of parts hereinafter fully described and claimed, and illustrated in the accompanying drawings, in which—

Figure 5:
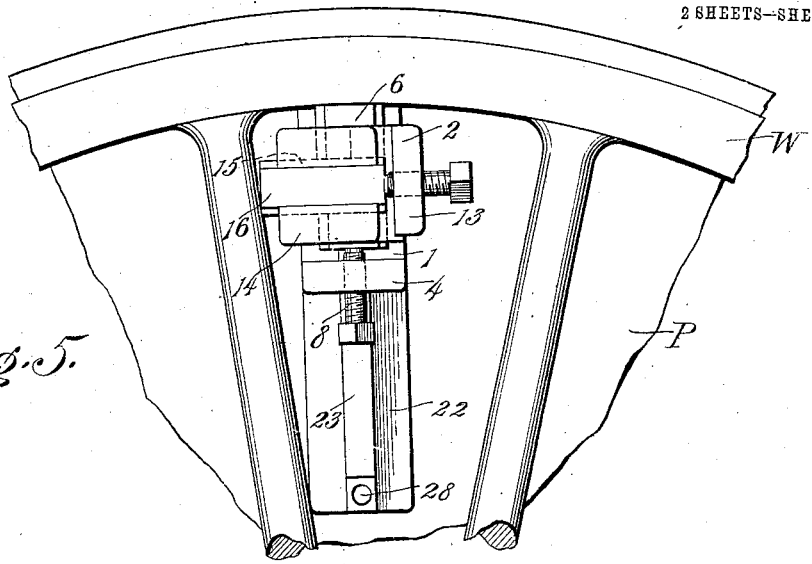
Figure 6:
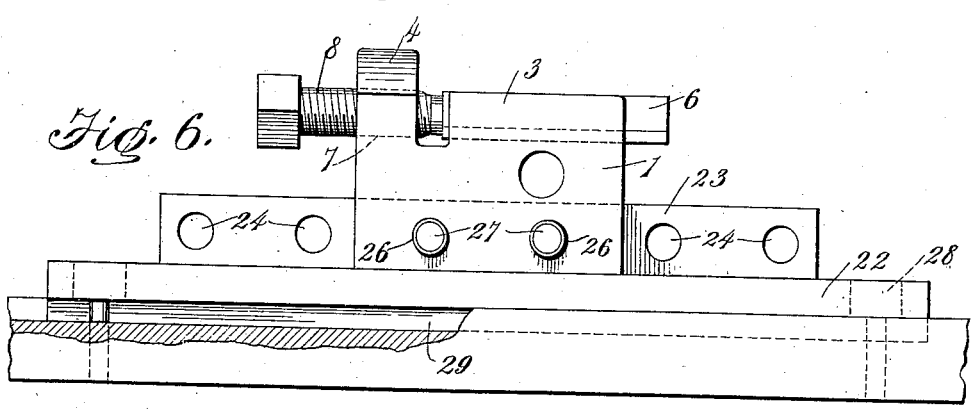
Figure 7:
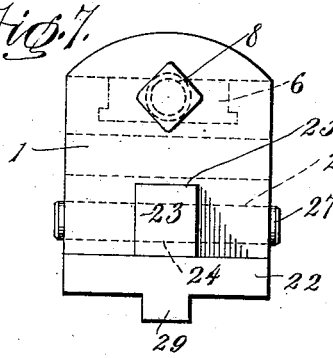
Figure 8:
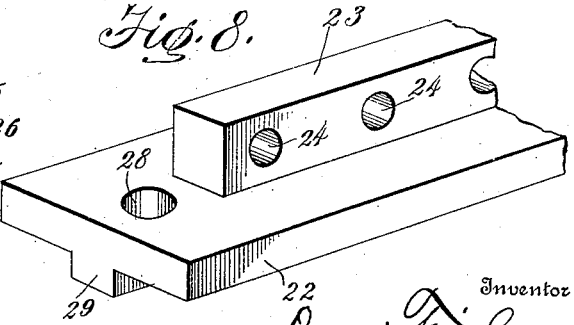

Figure 1 is a plan view of one embodiment of the improved combination chuck and driving dog showing the same arranged on the face plate of a lathe and used both as a work chuck and driving dog; Fig. 2 is a side elevation of the combined device; Figs. 3 and 4 are elevations of opposite ends of the same; Fig. 5 is a view similar to Fig. 1 showing an improved means for adjusting the device radially upon the face plate; Fig. 6 is a side elevation of the parts shown in Fig. 5, the face plate being broken away and in section and the upper chuck being removed from the lower one; Fig. 7 is an end elevation of the parts shown in Fig. 6, the face plate being omitted; and Fig. 8 is a perspective view of one end of the supporting and guide bar on which the chuck is adjusted.

The combination chuck and dog comprises two body members 1, 2 each provided with adjustable jaws disposed in planes at right angles to each other. The lower body member 1 is adapted to be secured to the face plate of a lathe, the bed plate of a boring machine or the like and the upper body member 2 is detachably mounted upon the lower body member. Said body member 1 is in the form of a substantially rectangular block provided at its bottom with suitable means for adjustable connection with the face plate or other support on which it is mounted and formed upon its top with spaced projections 3, 4, the former of which is grooved, as shown at 5, to slidably receive a jaw 6 and the latter of which is formed with a threaded opening 7 to receive a screw 8 for adjusting the jaw 6. The walls of the groove or channel 5 in the projection 3 are undercut, as shown at 9, to receive ribs or flanges 10 formed on the opposite sides of the jaw 6, which latter may have its outer end of any suitable shape to engage the work which is to be held by the clutch upon the face plate or bed plate. The other or upper body member 2 is in the form of a similar shaped block formed in its bottom with a channel or recess 11 to receive the projection 3 so that the upper body member straddles the lower one. The two body members are detachably secured by a transverse pin 12 passed through alining openings in the two body members, as clearly illustrated in the drawings. The upper portion of the body member 2 is provided with two spaced projections 13, 14 which are similar to the projections 3, 4, the former having an undercut guide groove 15 to receive a flanged jaw 16 and the latter having a screw threaded opening 17 to receive a jaw adjusting screw 18. From the foregoing it will be seen that the device consists of two similar body or chuck members superposed and detachably united and each provided with a slidable jaw adjustable by means of a screw, the jaws being disposed in planes at right angles to each other when the two body members or chucks are superposed and connected.

Any suitable means may be provided for mounting and adjusting the lower body or chuck member 1 upon the face plate of a lathe, the bed plate of a boring machine or the like but, as shown in Figs. 1 to 4 inclusive of the drawings, the bottom of the member 1 is formed with a base portion or flange 19 apertured, as shown at 20, to receive bolts or similar fastenings and provided upon its bottom with a rib 21 to enter a groove or channel in the face or bed plate.

In order to enable the lower body or chuck member 1 to be more quickly and easily adjusted than when it is connected by means of bolts, the perforated bar 22 shown in Figs. 5 to 8 inclusive of the drawings is preferably employed. Said bar or plate is provided with a rib 23 formed with a longitudinal series of equally distant spaced transverse openings 24. The bottom of the member 1 is formed with a longitudinal channel or groove 25 to slidably receive the rib 23 and said member is also formed with transverse openings 26 adapted to be brought into register with the openings 24 in said rib to permit removable pins 27 to be passed through said alining or registering openings. When the body 1 is thus connected to the bar or plate 22, it may be quickly and easily adjusted by simply removing the pins 27 and then shifting the member longitudinally on the rib 23. The bar or plate 22 may be connected to the face plate or bed plate in any suitable manner. As illustrated in Fig. 6 its ends are formed with openings 28 to receive bolts or similar fastenings and its bottom is formed with a rib 29 to enter a groove or channel in the face plate.

In using the invention as a combined work chuck and driving dog, as shown in Figs. 1 and 5 of the drawings, the lower body member or chuck 1 is secured directly to the face plate P, as shown in Fig. 1, or to the supporting and guide bar 22, as shown in Fig. 5. The two jaws 6, 16 are then adjusted by means of the screws 8, 18 so that the jaw 6 engages the inner face of the rim of the wheel W or other piece of work and the jaw 16 engages one of the spokes of the wheel. When the device is thus used, the jaw 16 serves as a driving dog while the jaw 6 serves as a work chuck. The lower body member or chuck 1 may be used without the upper body member or chuck 2 as a work chuck for engaging the inner or the outer face of a car wheel tire so that the latter may be turned or bored and it may be used in various other ways as a work chuck upon the face plate of a lathe, the bed plate of a boring machine, etc.

Having thus described the invention what is claimed is:

1. A combined chuck and dog comprising two superposed members, means for connecting one of said members to a face plate or support, and a slidable jaw adjustably mounted on each of said members, one jaw being disposed substantially at right angles to the other.

2. A combined chuck and dog comprising a member having an opening, a second member channeled to straddle the first mentioned one and having openings to aline with the opening in the first mentioned member, a removable pin passed through said alining openings to detachably connect said members, and an adjustable jaw arranged upon each of said members, said jaws being movable in planes at right angles to each other.

3. The combination with a support, of a body member channeled to straddle said support and formed upon its top with spaced projections, one of said projections being formed with an undercut guide groove and the other with a threaded opening, a jaw slidable in said undercut guide groove, and a screw in said threaded opening and adapted to have one end engage one end of said jaw to adjust the same.

4. A device of the character described comprising a body member having attaching means upon its bottom, a jaw slidable in said body member, a screw for adjusting said jaw, a second body member having a channel in its bottom to straddle the first mentioned member, means for securing said members together and an adjustable jaw in the second member.

5. A device of the character described comprising a combined supporting and guiding bar formed with a rib having a longitudinal series of transverse openings, means for securing said bar to a face plate or the like, a body member channeled to receive said rib and formed with openings to aline with those in the rib, a removable pin passed transversely through the alining openings in the body member and rib to adjustably secure the former to the latter, and an adjustable jaw upon said body member.

6. A device of the character described comprising a combined supporting and guiding bar formed with a rib having a longitudinal series of transverse openings, a body member channeled to receive said rib and formed with openings to aline with those in said rib, a removable pin arranged in said alining openings, a second member to straddle the first mentioned member, the two members being formed with alining openings, a removable pin arranged in the last mentioned alining openings, and an adjustable jaw carried by each of said members, said jaws being disposed in planes at right angles to each other.

7. A device of the character described comprising a combined supporting and guiding bar, means for connecting the same to a face plate or the like, a body member longitudinally adjustable on said bar, a second body member superposed on the first mentioned one, means for detachably uniting said members, and an adjustable jaw upon each of said members, said jaws being disposed in planes substantially at right angles to each other.

In testimony whereof I hereunto affix my signature in the presence of two witnesses.

DYSON FISHER.

Witnesses:
CALVIN CROWNOVER,
FREDERICK BROWN.